P. S. DEVLAN.
Railway Car Truck.
No. 90,432.  Patented May 25, 1869.
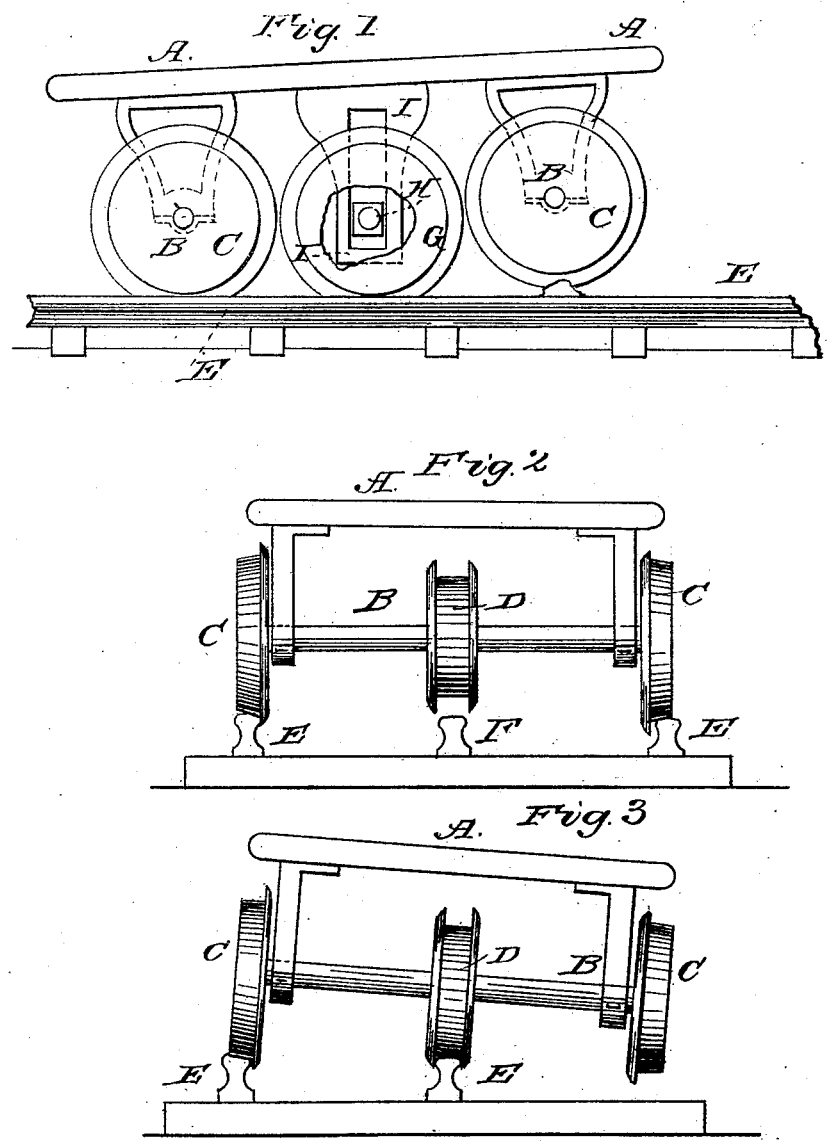

United States Patent Office.

PATRICK S. DEVLAN, OF JERSEY CITY, NEW JERSEY.

Letters Patent No. 90,432, dated May 25, 1869.

IMPROVED RAILWAY-CAR TRUCK.

The Schedule referred to in these Letters Patent and making part of the same.

*To all whom it may concern:*

Be it known that I, PATRICK S. DEVLAN, of Jersey City, Hudson county, New Jersey, have invented a new and improved Safety-Attachment for Railroad-Trucks; and I do hereby declare that the following is a full, clear, and exact description thereof, which will enable others skilled in the art to make and use the same, reference being had to the accompanying drawings, forming part of this specification, in which—

Figure 1 is a side view of a railroad-truck to which my improvement has been attached, part being broken away to show the construction.

Figure 2 is an end view of the same.

Figure 3 illustrates the working, when the truck encounters a broken or missing rail.

Similar letters of reference indicate corresponding parts.

My invention has for its object to furnish an improved attachment for railroad-trucks, whereby the same are prevented from being thrown from the track, in passing over any place in the road from which a rail on either side of the track has been displaced or removed; and It consists in the construction of various parts, as hereinafter more fully described.

A represents the truck-frame. B are the axles, to which the wheels C are attached, and which revolve in journal-boxes, connected with the truck-frame, in the ordinary manner.

To the middle parts of the axles B are attached double flanged wheels D, which should be a little smaller than the ordinary wheels C, the flanges of the wheels D being at about the same distance from the axes of the axles B as the tread of the wheels C, as shown in fig. 2.

E are the rails of the ordinary track, midway between which is placed a third line of rails, F, directly beneath the double-flanged wheels D, so that should the train encounter a broken or missing rail, allowing one side of the truck to drop, the central rail F will receive the central wheels D, and thus prevent the truck from moving laterally, and keep it in such a position that the side wheels will be in proper place when the side rails are again encountered.

Old or worn-out rails will answer every purpose for the central rails F, so that the expense of the central line of rails will be trifling.

G H are wheels and axles, of the same form, size, and construction as the wheels and axles C B, but the journal-boxes of which move up and down freely in the slots of the standards I, attached to the truck-frame A. By this construction, should the forward wheels of the truck encounter an obstruction, and be raised in passing over it, the wheels G will drop down, as shown in fig. 1, so as always to keep at least four of the wheels upon the track, thus keeping the truck in line with the track.

When the middle wheels, G, strike the obstruction, they rise and pass over it, and again drop to their places, ready to guide the truck while the rear wheels are passing over the said obstruction.

I claim as new, and desire to secure by Letters Patent—

The double-flanged wheel D, when secured to the axle B, at about the middle thereof, in combination with the central rail F, as and for the purpose specified.

The above specification of my invention signed by me, this 3d day of February, 1869.

P. S. DEVLAN.

Witnesses:
FRANK BLOCKLEY,
JAMES T. GRAHAM.